(12) United States Patent
Vecera et al.

(10) Patent No.: US 9,826,108 B2
(45) Date of Patent: Nov. 21, 2017

(54) MOBILE DEVICE CAMERA DISPLAY PROJECTION

(71) Applicant: Red Hat, Inc., Raleigh, NC (US)

(72) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 164 days.

(21) Appl. No.: 14/822,777

(22) Filed: Aug. 10, 2015

(65) Prior Publication Data

US 2017/0048402 A1     Feb. 16, 2017

(51) Int. Cl.

| H04N 1/00 | (2006.01) |
|---|---|
| H04N 5/232 | (2006.01) |
| G06K 9/00 | (2006.01) |
| G06K 9/32 | (2006.01) |
| G06K 9/22 | (2006.01) |
| H04N 1/21 | (2006.01) |

(52) U.S. Cl.
CPC ..... *H04N 1/00127* (2013.01); *G06K 9/00463* (2013.01); *G06K 9/228* (2013.01); *G06K 9/32* (2013.01); *H04N 1/00307* (2013.01); *H04N 1/2112* (2013.01); *H04N 5/23293* (2013.01); *H04N 2201/0084* (2013.01)

(58) Field of Classification Search
CPC ........... H04N 1/00127; H04N 1/00307; H04N 1/2112; H04N 5/23293; H04N 2201/0084; G06K 9/32; G06K 9/228; G06K 9/00463
See application file for complete search history.

(56) References Cited

U.S. PATENT DOCUMENTS

| 8,589,374 B2* | 11/2013 | Chaudhri ............ G06F 3/04817 345/173 |
|---|---|---|
| 8,948,819 B2 | 2/2015 | Yun et al. |
| 8,988,543 B2 | 3/2015 | Goktekin et al. |
| 2012/0188271 A1 | 7/2012 | Kim |
| 2013/0098982 A1 | 4/2013 | Adams |

(Continued)

OTHER PUBLICATIONS

Matei Negulescu, Open Project: A Lightweight Framework for Remote Sharing of Mobile Applications, Oct. 8-11, 2013, 10 pages; University of British Columbia; Google Research.

(Continued)

*Primary Examiner* — Luong T Nguyen
(74) *Attorney, Agent, or Firm* — Haynes and Boone, LLP

(57) ABSTRACT

An example method of providing data to an application running on a mobile device includes receiving a request from a first application to activate a camera interface. The method also includes switching the mobile device into an application selection mode and displaying a set of applications on the display of the mobile device. The method further includes detecting a first input selection of a second application and displaying a document on the display of the mobile device. The document is associated with the second application. The method also includes detecting, while the document is displayed on the display, a second input selection of a user selectable option to activate a software camera of the mobile device. The method further includes capturing a screenshot of the document displayed on the display in response to detecting the second input selection. The method also includes providing the captured screenshot to the first application.

20 Claims, 13 Drawing Sheets

(56) References Cited

U.S. PATENT DOCUMENTS

| | | | | |
|---|---|---|---|---|
| 2014/0137020 A1* | 5/2014 | Sharma | ............... | G06F 3/0486 |
| | | | | 715/769 |
| 2014/0143143 A1* | 5/2014 | Fasoli | ............... | G06Q 20/023 |
| | | | | 705/44 |
| 2014/0237405 A1 | 8/2014 | Wu | | |
| 2014/0320413 A1 | 10/2014 | Goktekin | | |
| 2014/0358919 A1* | 12/2014 | Chandra | ............... | H04N 1/21 |
| | | | | 707/737 |
| 2014/0362007 A1* | 12/2014 | Jung | ............... | G06F 3/04883 |
| | | | | 345/173 |

OTHER PUBLICATIONS

"Split Media Labs," 9 pages, retrieved from http://www.splitmedialabs.com/ on Aug. 10, 2015.
"Camera", 19 pages.
The Best Free Live Studio & Webcam Effects Software, 2 pages; retrieved from https://manycam.com/ on Aug. 10, 2015.

* cited by examiner

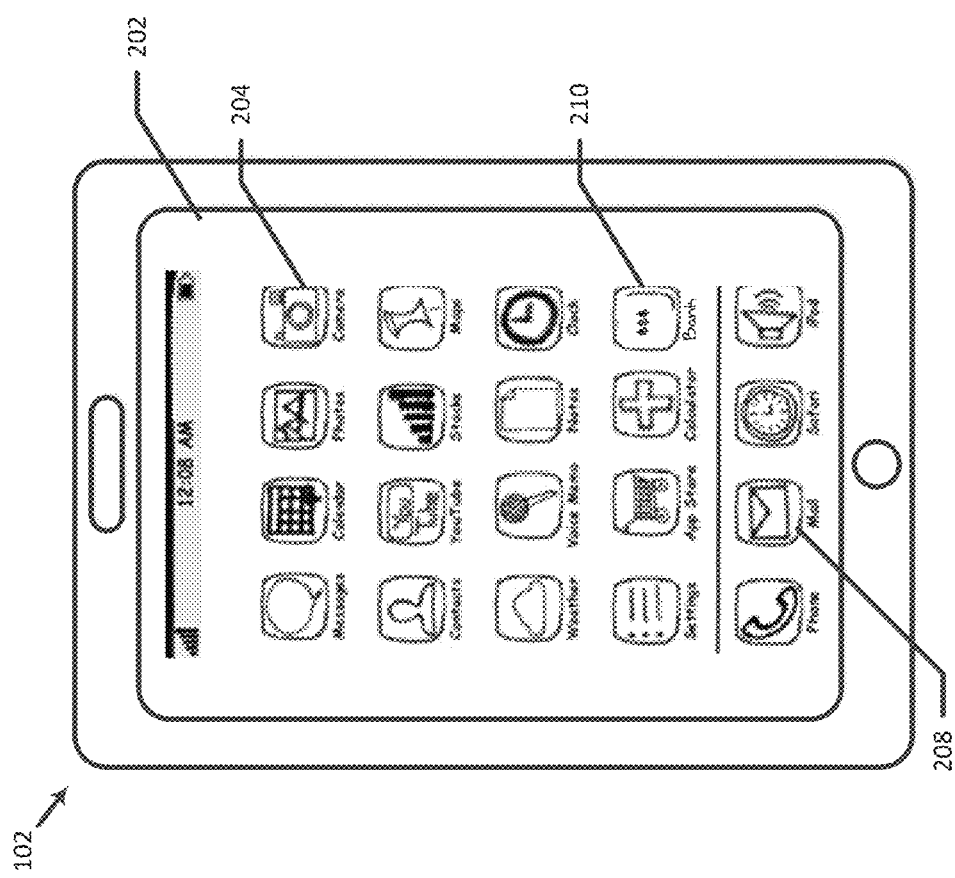

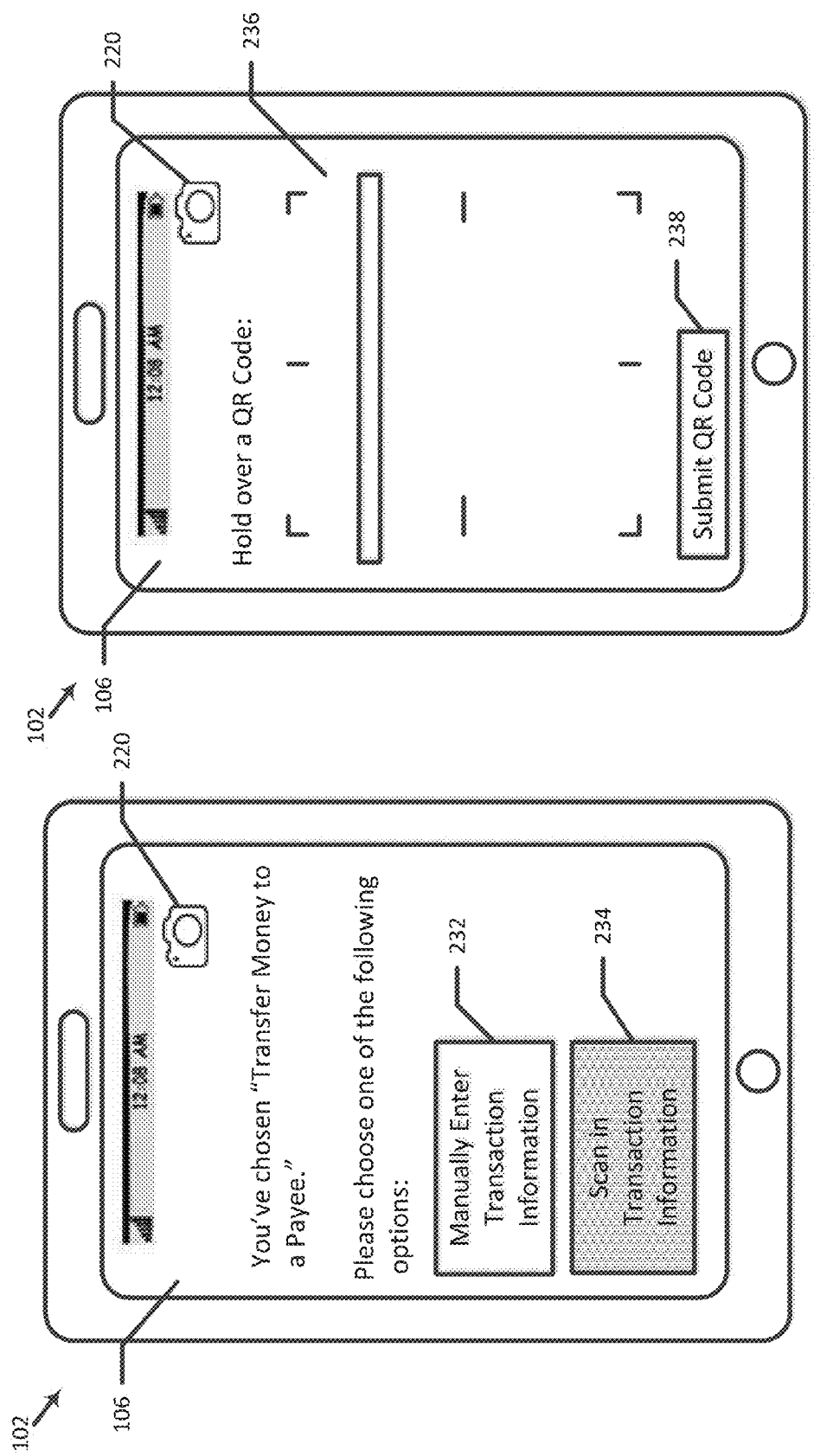

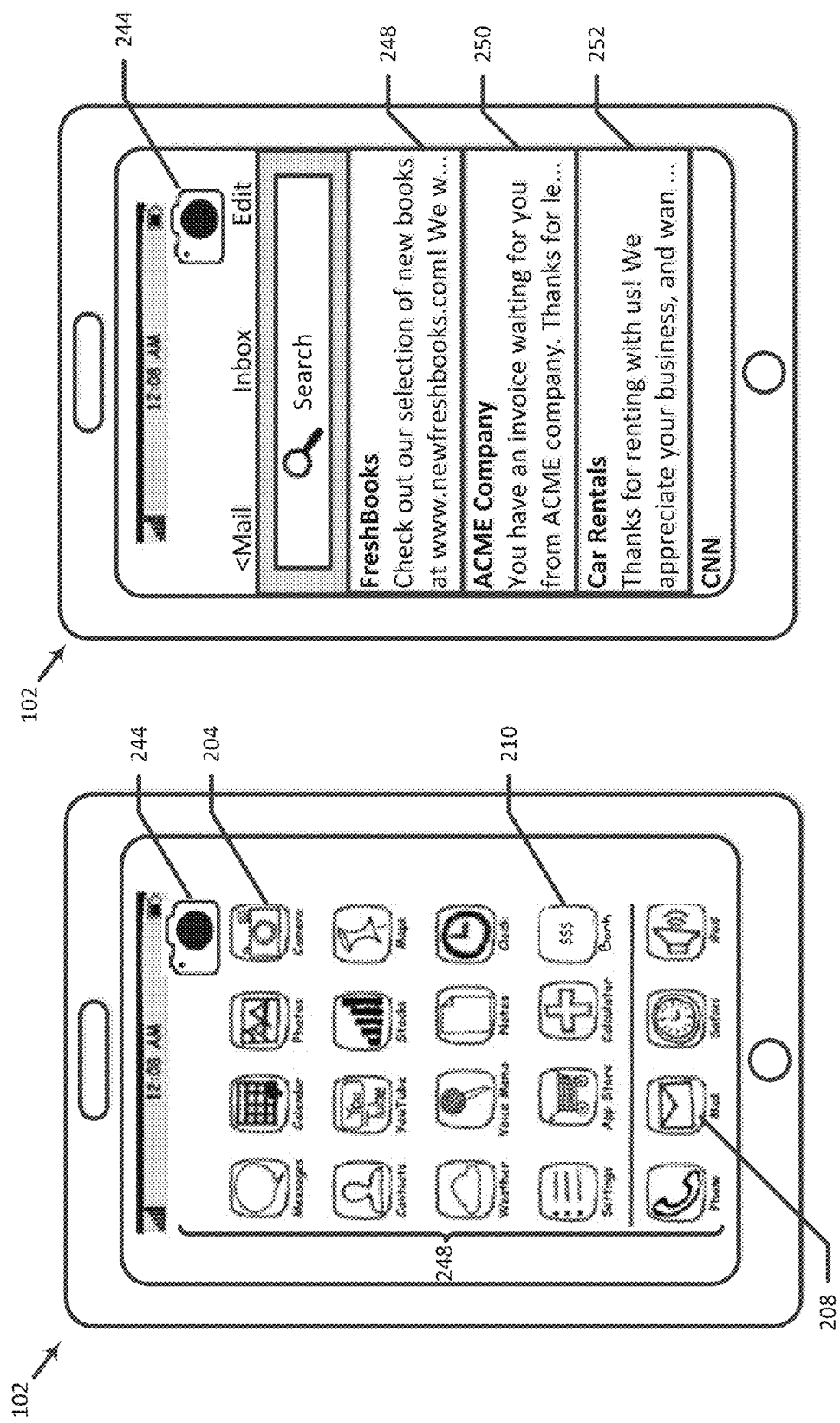

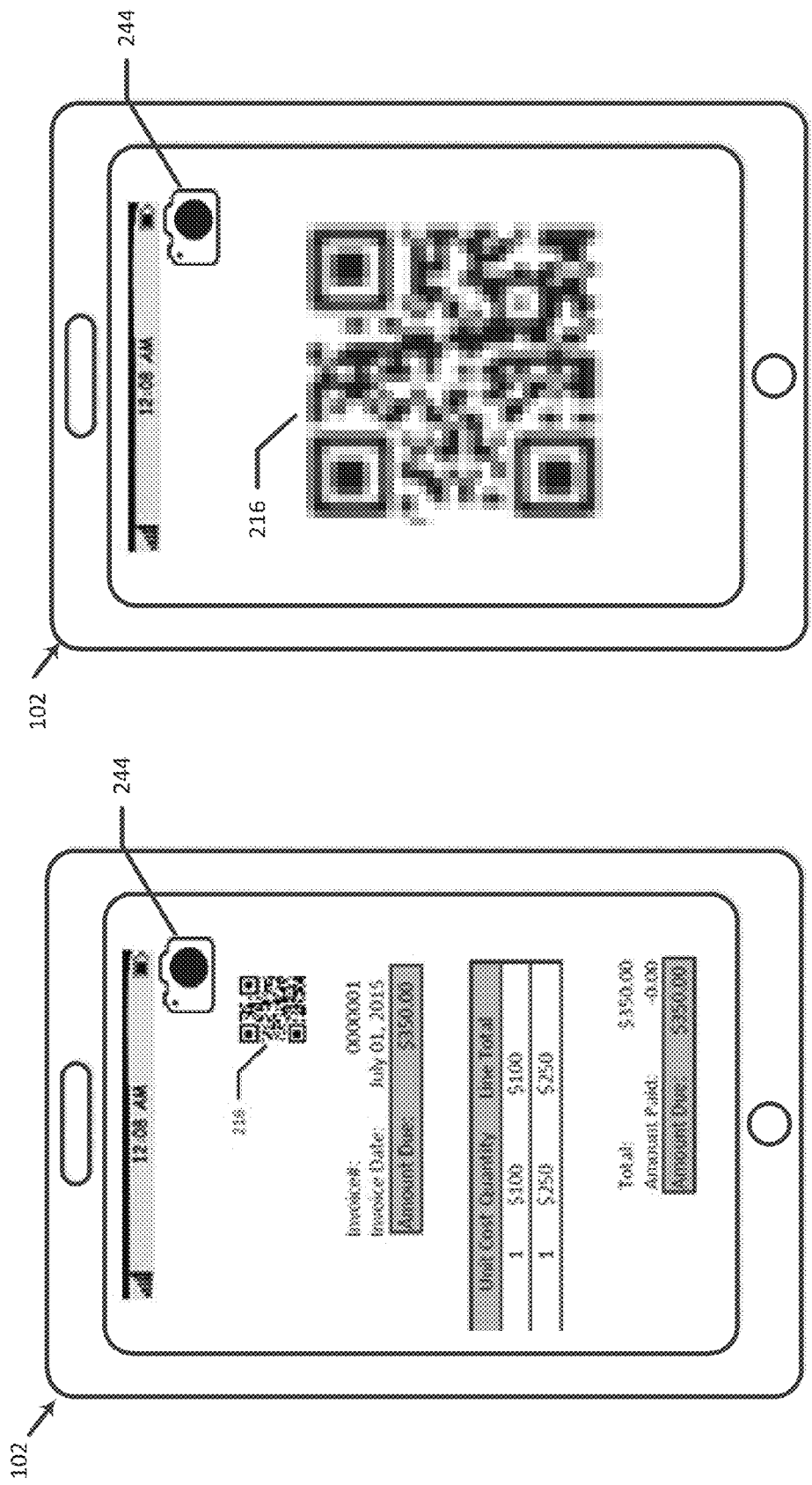

MOBILE DEVICE CAMERA DISPLAY PROJECTION

FIELD OF DISCLOSURE

The present disclosure generally relates to providing data to an application, and more specifically to providing output from a camera to an application running on a mobile device.

BACKGROUND

Mobile devices are ubiquitous and may include a smartphone, tablet, portable digital assistant (PDA), portable game console, palmtop computer, and other portable electronic devices. In addition to the primary function of these devices, many include peripheral functions. For example, a smartphone may include the primary function of making telephone calls and the peripheral functions of playing a game, a still camera, a video camera, global positioning system (GPS) navigation, web browsing, sending and receiving emails, and sending and receiving text messages. As the functionality of such a device increases, users may be more dependent on their mobile devices.

BRIEF SUMMARY

Cameras are now a common feature of even the most basic mobile devices. Methods, systems, and techniques for providing data (e.g., images) to an application running on a mobile device are provided.

According to some embodiments, a method of providing data to an application running on a mobile device includes receiving, at a mobile device, a request from a first application to activate a camera interface. The method also includes switching the mobile device into an application selection mode. The method further includes displaying a set of applications on the display of the mobile device. The method also includes detecting a first input selection of a second application of the set of applications. The method further includes displaying a document on the display of the mobile device. The document is associated with the second application. The method also includes detecting, while the document is displayed on the display, a second input selection of a user selectable option to activate a software camera of the mobile device. The method further includes capturing a screenshot of the document displayed on the display in response to detecting the second input selection. The method also includes providing the captured screenshot to the first application.

According to some embodiments, a system for providing data to an application running on a mobile device includes an operating system that receives a request from a first application to activate a camera interface, switches a mobile device into an application selection mode, detects a first input selection of a second application of a set of applications, and detects, while a document is displayed on a display of the mobile device, a second input selection of a user selectable option to activate the software camera of the mobile device. The system also includes a display engine that displays the set of applications on a first page of the display and displays a document on a second page of the display. The document is associated with the second application. The system further includes a software camera that captures a screenshot of the document displayed on the display in response to detecting the second input selection. The system also includes a camera interface that provides the captured screenshot to the first application.

According to another embodiment, a machine-readable medium includes a plurality of machine-readable instructions that when executed by one or more processors is adapted to cause the one or more processors to perform a method including: receiving, at a mobile device, a request from a first application to activate a camera interface; switching the mobile device into an application selection mode; displaying a set of applications on the display of the mobile device; detecting a first input selection of a second application of the set of applications; displaying a document on the display of the mobile device, where the document is associated with the second application; detecting, while the document is displayed on the display, a second input selection of a user selectable option to activate a software camera of the mobile device; capturing a screenshot of the document displayed on the display in response to detecting the second input selection; and providing the captured screenshot to the first application.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

FIGS. 2A-2K illustrate content that is displayed to a user in accordance with one or more aspects of the present disclosure.

DETAILED DESCRIPTION

Figure 1:
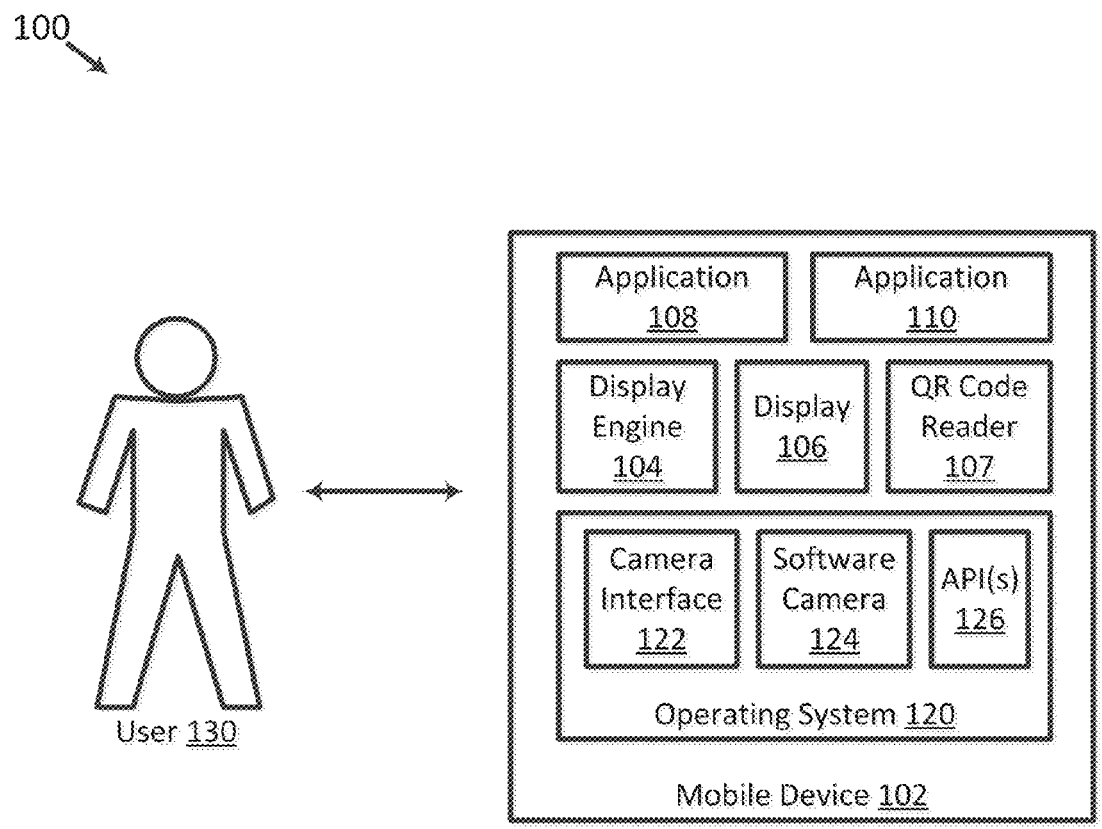
FIG. 1 is a block diagram illustrating a system for providing data to an application running on a mobile device in accordance with one or more aspects of the present disclosure.

I. Overview
II. Example System Architecture
III. Example Methods
IV. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

If a user opens up an application on her mobile device, the user may interact with the application. In some situations, it may be difficult for the user to provide an input for the application. For example, if the user receives an invoice with a Quick Response (QR) code in an email, the user may print out the invoice and use her banking application on her mobile device to scan the QR code to process the invoice and pay the payee. If, however, the user has difficulty printing out the invoice (because the user is on vacation, on a business trip, etc.), it may be difficult for the user to connect the banking application with the data from the email application. In particular, it may be difficult for the user to provide the QR code from the email application to the banking application.

To overcome this problem, it may be desirable to provide an application programming interface (API) extension to mobile device operating systems such that content that is displayed on a display of the mobile device is streamed to a camera output. Any applications that work with the camera may be able to use their current API; the live image of the display is captured by a software camera. The camera output is typically shown directly to the user and covers the originally opened application. For such cases, it may be desirable to block the window with the camera output, completely hide the application requiring the camera usage until the screenshot is captured, or allowing the user to select which application will be projected to the camera, regardless of the content displayed on the display of the mobile device. The image may be taken by a software camera icon that is displayed in the camera interface or by pressing particular hardware button(s) on the mobile device corresponding to the camera.

In some embodiments, a method of providing data to an application running on a mobile device includes receiving, at a mobile device, a request from a first application to activate a camera interface. The method also includes switching the mobile device into an application selection mode. The method further includes displaying a set of applications on the display of the mobile device. The method also includes detecting a first input selection of a second application of the set of applications. The method further includes displaying a document on the display of the mobile device. The document is associated with the second application. The method also includes detecting, while the document is displayed on the display, a second input selection of a user selectable option to activate a software camera of the mobile device. The method further includes capturing a screenshot of the document displayed on the display in response to detecting the second input selection. The method also includes providing the captured screenshot to the first application.

The present disclosure provides techniques to provide data to an application running on a mobile device. Unless specifically stated otherwise, as apparent from the following discussion, it is appreciated that throughout the description, discussions utilizing terms such as "determining," "generating," "sending," "receiving," "executing," "displaying," "capturing," "providing," "projecting," "detecting," "streaming," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 is a block diagram illustrating a system 100 for providing data to an application running on a mobile device in accordance with one or more aspects of the present disclosure. System 100 includes a mobile device 102 including display engine 104, display 106, application 108, and application 110. Although two applications are illustrated, this is not intended to be limiting, and mobile device 102 may include fewer or more than two applications. Applications 108 and 110 may run on mobile device 102. In an example, application 108 and/or application 110 may be a mobile application installed on mobile device 102. In another example, application 108 and/or application 110 may be a web application accessible via a unique resource locator (URL) to which a browser (not shown) executing on mobile device 102 points.

Mobile device 102 may be coupled to a network (not shown). The network may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

A user 130 may interact with application 108, 110 via mobile device 102. Display engine 104 displays content on display 106 for viewing by user 130. Display engine 104 may be in communication with application 108 and/or application 110, which may provide data to display engine 104 to display on display 106. In an example, user 130 requests data from application 108, 110, and the appropriate application provides the data to user 130 by passing the data to display engine 104, which then displays the data on display 106 for the user to view.

Mobile device 102 is equipped with a Quick Response (QR) code reader 107 that reads QR codes and accesses information encoded on the QR codes. A QR code is a quick way to access information. QR code reader 107 interprets the information encoded on a QR code and may perform various actions based on the information. In an example, the QR code redirects mobile device 102's Web browser to a destination predetermined by the code creator. In another example, the QR code reader transmits the information encoded in the QR code to an application running on mobile device 102. In another example, the QR code reader transmits the information encoded in the QR code to an application over a network.

Mobile device 102 also includes an operating system 120 that manages resources of mobile device 102 when one or more applications are running on the mobile device. In an example, operating system 120 may share available resources (e.g., CPU time, disk space, and network connections) between various system processes while at the same time ensuring system integrity. Operating system 120 serves as an intermediary layer between the hardware and software (e.g., applications 108 and 110). "Memory" herein shall refer to volatile or non-volatile memory, such as random access memory (RAM), read-only memory (ROM), electrically erasable ROM (EEPROM), or any other memory capable of storing data.

Hardware may include one or more central processing units (CPUs), memory, etc. A "CPU" may also be referred to as a "hardware processor," "physical processor," or "processor" herein. A CPU shall refer to a device capable of executing instructions encoding arithmetic, logical, or input/output (I/0) operations. In one illustrative example, a CPU may follow the Von Neumann architectural model and may include an arithmetic logic unit (ALU), a control unit, and a plurality of registers. In a further aspect, a CPU may be a single core CPU that is typically capable of executing one instruction at a time (or process a single pipeline of instructions), or a multi-core CPU that may simultaneously execute multiple instructions. In another aspect, a CPU may be implemented as a single integrated circuit, two or more integrated circuits, or may be a component of a multi-chip module (e.g., in which individual microprocessor dies are included in a single integrated circuit package and hence share a single socket).

Operating system 120 includes a camera interface 122, software camera 124, and API(s) 126. Camera interface 122 may include a plurality of options from which user 130 may select before taking a picture. For example, camera interface 122 may include a user selectable option that when selected activates a rear-facing camera (not shown) in mobile device 102, a user selectable option that when selected activates a front-facing camera (not shown) in mobile device 102, or a user selectable option that when selected activates a software camera 124 in mobile device 102. A rear-facing camera in a device has the lens facing away from the user, similar to a regular digital camera. In contrast, a front-facing camera in a device has the lens facing the user on the same side as the screen. Software camera 124 captures a screenshot (or an image) of the content displayed on display 106.

Figure 2B:

FIGS. 2A-2K illustrate content that is displayed to a user in accordance with one or more aspects of the present disclosure. FIG. 2A displays a homepage 202 on a display of mobile device 102 in accordance with one or more aspects of the present disclosure. Display engine 104 (see FIG. 1) may display homepage 202, which includes a plurality of applications from which user 130 may select. In the example illustrated in FIG. 2A, homepage 202 includes a camera application 204, an email application 208, and a banking application 210, among others. It should be understood that homepage 202 may include additional, fewer, and/or different applications from that shown in FIG. 2A.

Camera application 204 may correspond to mobile device 102's stock camera. User 130 may use banking application 210, for example, to check account and credit card balances, deposit checks from mobile device 102, transfer money between user 130's accounts or from user 130's account to another account. User 130 may use email application 208, for example, to read and send emails. FIG. 2B shows an example invoice 214 that may be sent to user 130 via email. Invoice 214 includes a Quick Response (QR) code 216, which may be a two-dimensional barcode including small black squares within a larger square on a white background. QC code 216 stores information about invoice 124. For example, QC code 216 may store information indicating that the payee is ACME Company, the payee's account number for the payment is "9988-7766," and the amount to be paid is $350.00.

Figures 2C, 2D:
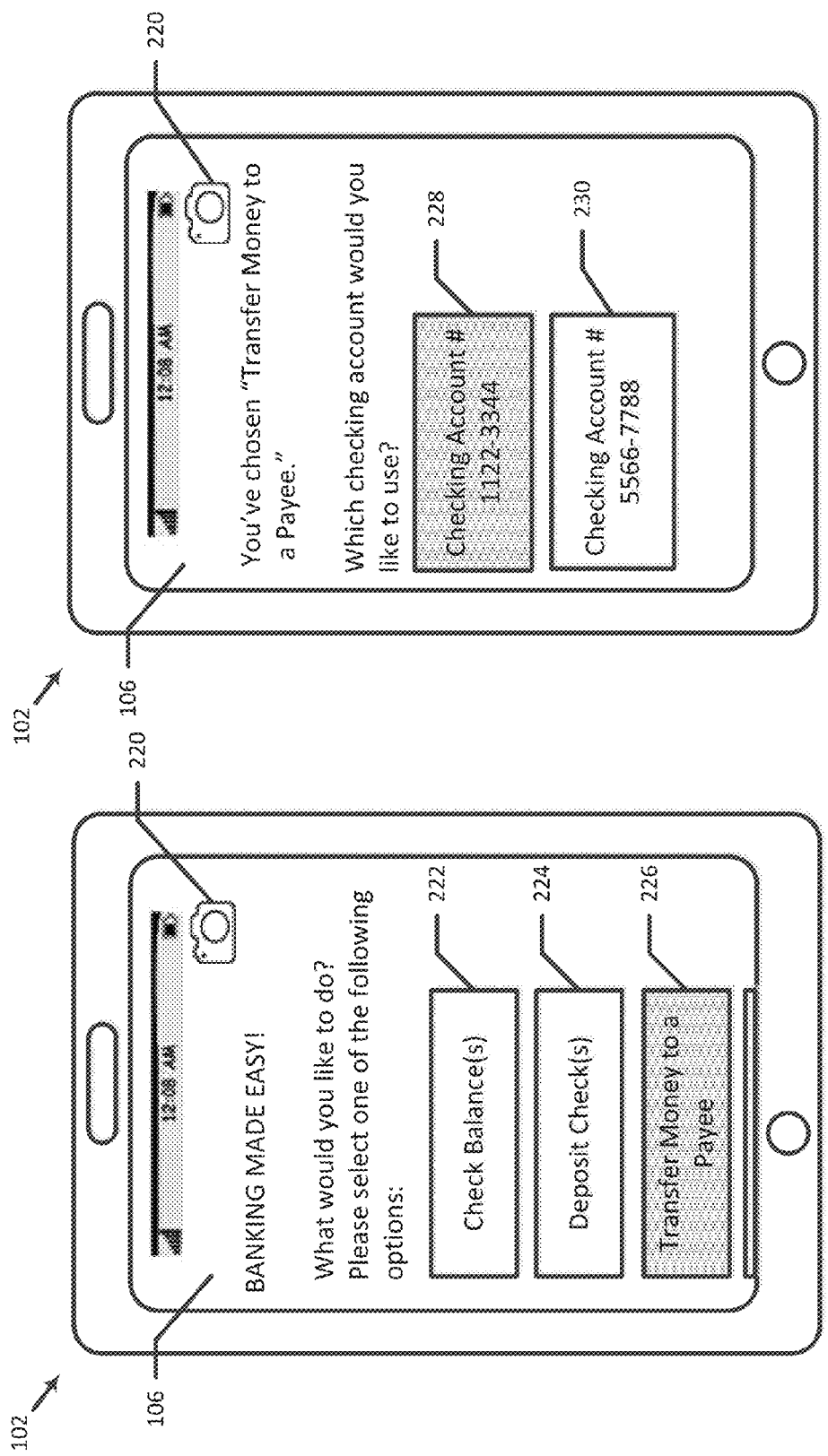

User 130 may be aware that invoice 214 is sitting in her inbox and accordingly select banking application 210 to pay the invoice using one or more accounts that she has with the bank. FIG. 2C shows content that may be displayed to user 130 on a display of mobile device 102, after banking application 210 is selected in accordance with one or more aspects of the present disclosure. Display engine 104 may display the homepage of banking application 210 on the display of mobile device 102 in FIG. 2C. In FIG. 2C, a camera interface icon 220 is displayed. Operating system 120 may instruct display engine 104 to display camera interface icon 220 on the display of mobile device 102. Camera interface 122 (see FIG. 1) may be activated in response to user 130 selecting camera interface icon 220. For one or more documents that are displayed on display 106 to user 130, operating system 120 may provide user 130 with a user selectable option to activate camera interface 122 by selecting camera interface icon 220. If camera interface 122 is activated, it is displayed on display 106. If display 106 is a touchscreen display, user 130 may select camera interface icon 220 by, for example, touching her finger or a stylus at a location relative to camera interface icon 220 on the display. It should be understood that user 130 may select camera interface icon 220 using other techniques which are within the scope of the present disclosure.

In FIG. 2C, banking application 210 provides the user with a plurality of user selectable options from which to select. If user 130 selects user selectable option "Check Balances" 222, banking application 210 provides the user with the user's account balances. If user 130 selects user selectable option "Deposit Checks" 224, banking application 210 allows the user to deposit one or more checks using mobile device 102. If user 130 selects user selectable option "Transfer Money to a Payee" 226, banking application 210 allows the user to transfer money to another entity.

User 130 may continue to navigate banking application 210. For example, user 130 may select user selectable option "Transfer Money to a Payee" 226, which is shown in a shaded color. FIG. 2D shows content that may be displayed to user 130 on a display of mobile device 102, after user selectable option "Transfer Money to a Payee" 226 is selected in accordance with one or more aspects of the present disclosure. Display engine 104 may display the content shown on the display of mobile device 102 in FIG. 2D. In FIG. 2D, camera interface icon 220 is displayed. Operating system 120 may instruct display engine 104 to display camera interface icon 220 on the display of mobile device 102. Additionally, banking application 210 provides the user with a plurality of user selectable options from which to select. If user 130 selects user selectable option "Checking Account #1122-3344" 228, banking application 210 transfers money from this checking account number to another entity. If user 130 selects user selectable option "Checking Account #5566-7788" 230, banking application 210 transfers money from this checking account number to another entity.

User 130 may select user selectable option "Checking Account #1122-3344" 228, which is shown in a shaded color. FIG. 2E shows content that may be displayed to user 130 on a display of mobile device 102, after user selectable option "Checking Account #1122-3344" 228 is selected in accordance with one or more aspects of the present disclosure. Display engine 104 may display the content shown on the display of mobile device 102 in FIG. 2E. In FIG. 2E, camera interface icon 220 is displayed. Operating system 120 may instruct display engine 104 to display camera interface icon 220 on the display of mobile device 102.

Additionally, banking application 210 provides the user with a plurality of user selectable options from which to select. If user 130 selects user selectable option "Manually Enter Transaction Information" 232, banking application 210 may provide one or more input fields in which user 130 may manually provide additional information about the transfer (e.g., by typing in the payee's name, payee's account number, amount of transaction, etc.). If user 130 selects user selectable option "Scan in Transaction Information" 234, banking application 210 may provide the user with an input field in which user 130 scans information that is passed to banking application 210 and is used as input into the banking application.

User 130 may select user selectable option "Scan in Transaction Information" 234, which is shown in a shaded color. FIG. 2F shows content that may be displayed to user 130 on a display of mobile device 102, after user selectable option "Scan in Transaction Information" 234 is selected in accordance with one or more aspects of the present disclosure. Display engine 104 may display the content shown on the display of mobile device 102 in FIG. 2F. In FIG. 2F, camera interface icon 220 is displayed. Operating system 120 may instruct display engine 104 to display camera interface icon 220 on the display of mobile device 102. Additionally, banking application 210 may provide an input field 236 and a user selectable option "Submit QR Code" 238 that is displayed on the display. Banking application 210 may send a request to operating system 120 for particular data (e.g., a QR code). When operating system 120 receives this data, operating system 120 passes it along to banking application 210.

If user 130 has a printout of invoice 214 (see FIG. 2B), user 130 may position mobile device 102 in such a way that QR code 216 appears within input field 236 (or within a threshold distance of input field 236) and then select user selectable option "Submit QR Code" 238 to scan QR code 216. Mobile device 102's stock camera (e.g., rear-facing camera) may capture an image of QR code 216 on invoice 214, and banking application 210 may accept the information encoded in QR code 216 as input from mobile device 102's stock camera. In some examples, banking application 210 includes QR code reader 107. In some examples, banking application 210 and QR code reader 107 are separate applications that communicate with each other. For example, banking application 210 may activate mobile device 102's stock camera in response to detecting an input selection of user selectable option "Submit QR Code" 238. In this example, camera application 204 may capture an image of QR code 216 in response to being activated by banking application 210, and submit the captured image of QR code 216 to QR code reader 107. QR code reader 107, which accesses the information encoded on QR code 216, passes the information along to banking application 210 as input. Banking application 210 may then process the information encoded on QR code 216 and complete the transaction.

Typically, when an application is opened and the user is interacting with the application, the application may not allow a user to select files, pictures, or documents that are stored on mobile phone and then provide those files, pictures, or documents to the application. For example, an application typically allows the user to turn on a camera and capture a snapshot at the current moment. The present disclosure overcomes these problems. In some embodiments, a camera interface is provided that allows the user to select files, pictures, or documents and display the selected data on the display. The user may then capture a screenshot of the content on the display and provide the screenshot to an application that requested such content. In an example, the screenshot may be streamed into the camera output so that applications using the camera have access to this data.

If user 130 would rather capture an image of QR code 216 from the email application 208 (e.g., the electronic copy of invoice 214 in user 130's email inbox), user 130 may select camera interface icon 220 in the upper right-hand corner of the display to activate camera interface 122 in order to capture an image of QR code 216, which is content from email application 208 and provided to banking application 210 as input for processing. Operating system 120 may receive a request from banking application 210 to activate camera interface 122 in response to detecting an input selection of camera interface icon 220 displayed with content from banking application 210. In this example, camera interface 122 has been activated by banking application 210. Banking application 210 may activate camera interface 122 by invoking API(s) 126 provided by operating system 120. For example, banking application 210 may invoke API(s) 126 for activating camera interface 122 in response to user 130 selecting "Submit QR Code" 238 to scan a QR code, and expect an image back from camera interface 122. While camera interface 122 is activated and waiting for an image to be written back to it, banking application 210 may remain in an open state and wait for the image from camera interface 122. Banking application 210 may request an image and remain in an open state until banking application 210 receives an image from camera interface 122.

Figure 2G:
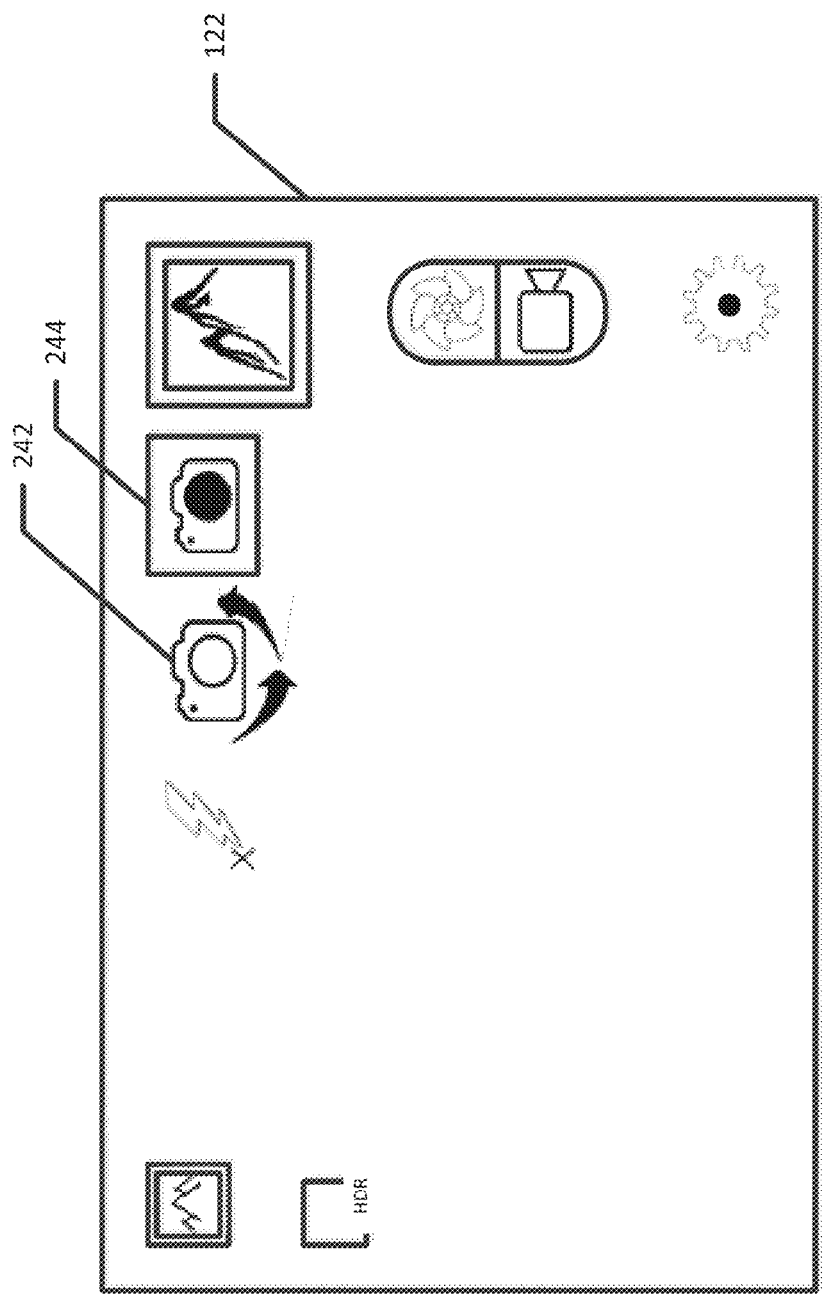

FIG. 2G shows content that may be displayed to user 130 on a display of mobile device 102, after camera interface icon 220 is selected in accordance with one or more aspects of the present disclosure. In this example, user 130 has selected camera interface icon 220 within banking application 210. User 130 is interacting with banking application 210 and selects camera interface icon 220 while on a page provided by banking application 210. Accordingly, banking application 210 is the requesting application that is requesting an image, which banking application 210 will consume as input.

In FIG. 2G, camera interface 122 is displayed on the display of mobile device 102 and includes, among other icons, a stock camera icon 242 and a software camera icon 244. Operating system 120 may instruct display engine 104 to display camera interface 122 including stock camera icon 242 and software camera icon 244 on the display of mobile device 102, and display engine 104 may display such content in response to the request from banking application 210 to activate camera interface 122. Each of stock camera icon 242 and software camera icon 244 is a user selectable option. User 130 may be able to use mobile device 102's stock camera (e.g., rear-facing camera or front-facing camera) to capture an image in response to user 130 selecting stock camera icon 242. User 130 may be able to use software camera 124 to capture a screenshot of content displayed on the display of mobile device 102 in response to user 130 selecting software camera icon 244.

For one or more documents that are displayed on display 106 to user 130, operating system 120 may instruct display engine 104 to display software camera icon 244 such that user 130 may activate software camera 124 by selecting software camera icon 244. Operating system 120 may switch mobile device 102 into an application selection mode in response to the activation of software camera 124. In the application selection mode, user 130 may select an application that is displayed on display 106. As user 130 navigates through content on mobile device 102, user 130 may capture screenshots of the displayed pages provided by different applications. Operating system 120 may switch mobile device 102 out of the application selection mode after user 130 has selected an application to provide the data to banking application 210, the requesting application. If software camera icon 244 blocks content on the screen, user 130 may "drag and drop it" to another location of the screen.

Operating system 120 may instruct display engine 104 to display particular content (e.g., home screen) in response to user 130 selecting software camera icon 244. Additionally, operating system 120 may block mobile device 102 from activating banking application 210 until the requested image has been captured. FIG. 2H shows first content 248 that may be displayed to user 130 on a display of mobile device 102, after software camera icon 244 is selected in accordance with one or more aspects of the present disclosure. First content 248 includes software camera icon 244 and a set of applications on the display of mobile device 102. User 130 may navigate through her mobile device and display anything on the screen of which she would like to capture a screenshot. For example, user 130 may navigate through mobile device 102 to find the data that the user wishes to provide as an input into banking application 210. First content 248 provides user 130 with the ability to select an application from which banking application 210 will accept data as input.

In keeping with the example above, banking application 210 accepts input data (e.g., QR code 216 included on invoice 214) provided by email application 208. Accordingly, user 130 may select email application 208, and operating system 120 may detect an input selection of an application (e.g., email application 208) of the set of displayed applications. FIG. 2I shows content that may be displayed to user 130 on a display of mobile device 102, after user 130 selects email application 208 in accordance with one or more aspects of the present disclosure. Operating system 120 may instruct display engine 104 to display software camera icon 244 along with user 130's emails 248, 250, and 252 from the user's inbox associated with email application 208, and display engine 104 may display such content on the display of mobile device 102 in FIG. 2I. Operating system 120 may project, while banking application 210 is active, data from email application 208 to the display of mobile device 102. In particular, even though banking application 210 is in an active state waiting for an image from camera interface 122, data that is provided by email application 208 may be displayed on display 106. Accordingly, banking application 210 may request an image and remain in an open state until banking application 210 receives the image.

User 130 may select email 250, which is the email that includes the data that banking application 210 uses as input for further processing. FIG. 2J shows content that may be displayed to user 130 on a display of mobile device 102, after user 130 selects email 250 in accordance with one or more aspects of the present disclosure. The invoice may be in the body of the email or an email attachment. Operating system 120 may instruct display engine 104 to display software camera icon 244 and email application 208 may provide invoice 214 to display engine 104, and display engine 104 may display such content on the display of mobile device 102 in FIG. 2J. User 130 may enlarge QR code 216 on the display by zooming in on the QR code. FIG. 2K shows an enlarged QR code 216 on the display of mobile device 102, after user 130 enlarges the QR code in accordance with one or more aspects of the present disclosure. Although the document provided by email application 208 is described as being an invoice, it should be understood that email application 208 may provide any document to display engine 104 for display to user 130.

Figure 3A:
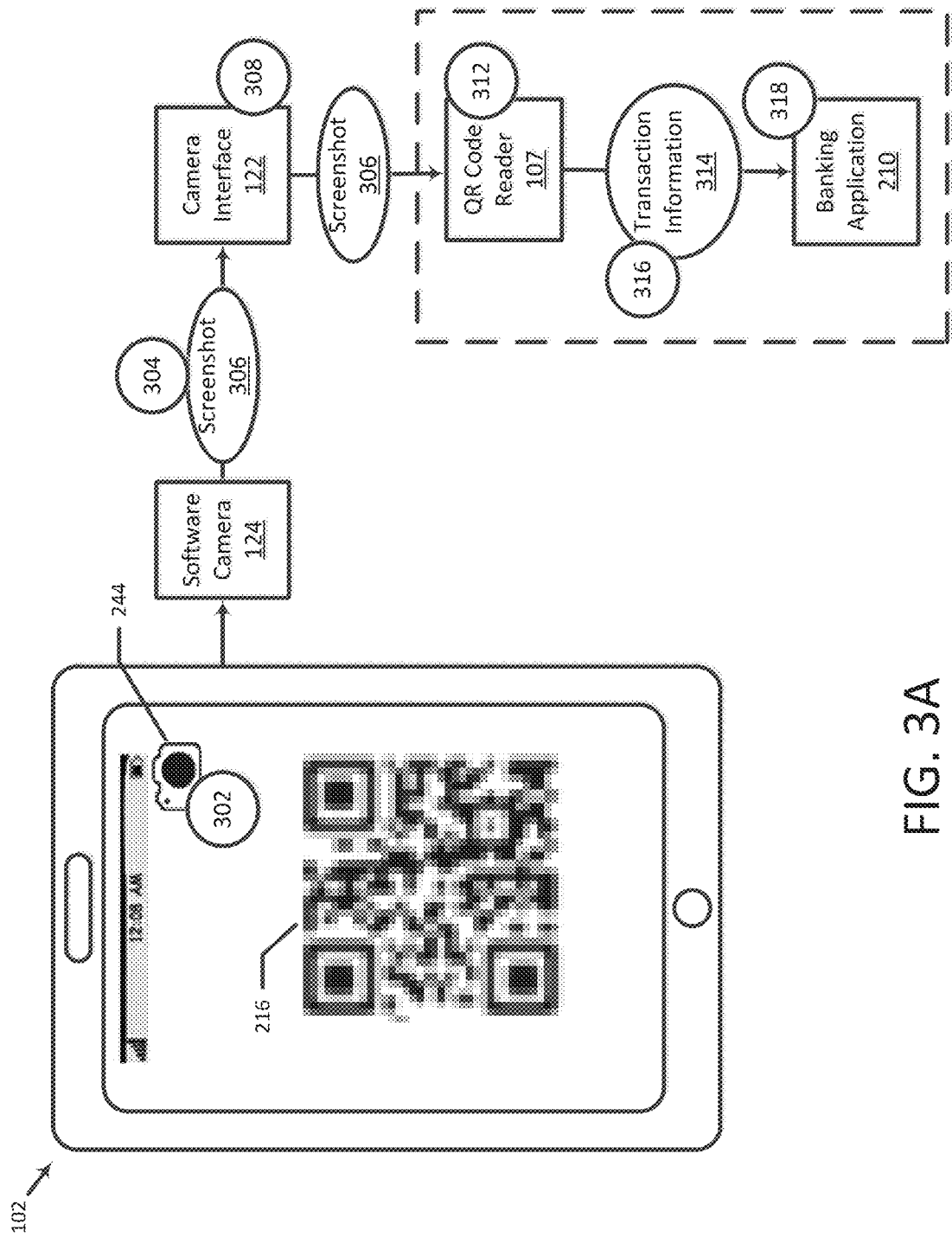
FIG. 3A is a process flow of capturing a screenshot of information provided by an email application and sending information included in the screenshot to a banking application as input for the banking application to process.

FIG. 3A is a process flow of capturing a screenshot of information provided by email application 208 and sending the information included in the screenshot to banking application 210 as input for banking application 210 to process. FIG. 3A shows an enlarged QR code 216 and software camera icon 244 on a display of the mobile device, after user enlarges QR code 216 in accordance with one or more aspects of the present disclosure. Operating system 120 may instruct display engine 104 to display software camera icon 244 and enlarged QR code 216, and display engine 104 may display such content on the display of mobile device 102.

At an action 302, user 130 may select software camera icon 244 to activate software camera 124. Operating system 120 may detect an input selection of software camera icon 244. At an action 304, software camera icon 244 captures a screenshot 306 of the content displayed on the display of mobile device 102 in response to the selection of software camera icon 244. Screenshot 306 is an output of software camera 124 and includes an image of QR code 216.

At an action 308, software camera 124 may provide screenshot 306 to camera interface 122 as an input. By activating software camera 124, screenshot 306 is captured and returned to camera interface 122. In an example, user 130 user may view screenshot 306 on camera interface 122 and reject screenshot 306. User 130 may reject screenshot 306 and decide to take another screenshot. In this example, user 130 may select software camera icon 244 that is displayed on camera interface 122 in order to navigate through mobile device 102 to find data to capture in a screenshot.

In another example, user 130 may accept screenshot 306. Any application may then use screenshot 306 as an input. Screenshot 306 may be written to the application that originally requested it (e.g., banking application 210). Screenshot 306 may be returned to the application that requested the activation of camera interface 122. In this example, it does not matter whether the stock camera captured an actual photo of QR code 216 printed in paper or whether software camera 124 captured a screenshot of QR code 216. Accordingly, even if applications do not allow users to use particular file formats as their input, software camera 124 may be used to capture and provide the input, thus overcoming this issue. In some examples, email application 208 or software camera 124 sends a request to invoke an API(s) 126 provided by operating system 120, where API(s) 126 includes screenshot 306 and is a request to operating system 120 to provide the screenshot 306 to the requesting application (e.g., banking application 210).

In the example illustrated in FIG. 3A, camera interface 122 may provide screenshot 306 to QR code reader 107, which may receive and process screenshot 306. At an action 312, QR code reader 107 may identify QR code 216 and read the information encoded on QR code 216. QR code reader 107 may extract the information encoded on QR code 216 to produce transaction information 314. Transaction information 314 includes at least some of the information encoded on QR code 216 in a format that is understandable by banking application 210. At an action 316, QR code reader 107 provides transaction information 314 to banking application 210 as an input that is used and processed by banking application 210. In an example, transaction information 314 includes the payee's name, payee's account number, amount of transaction, etc.

Figure 3C:
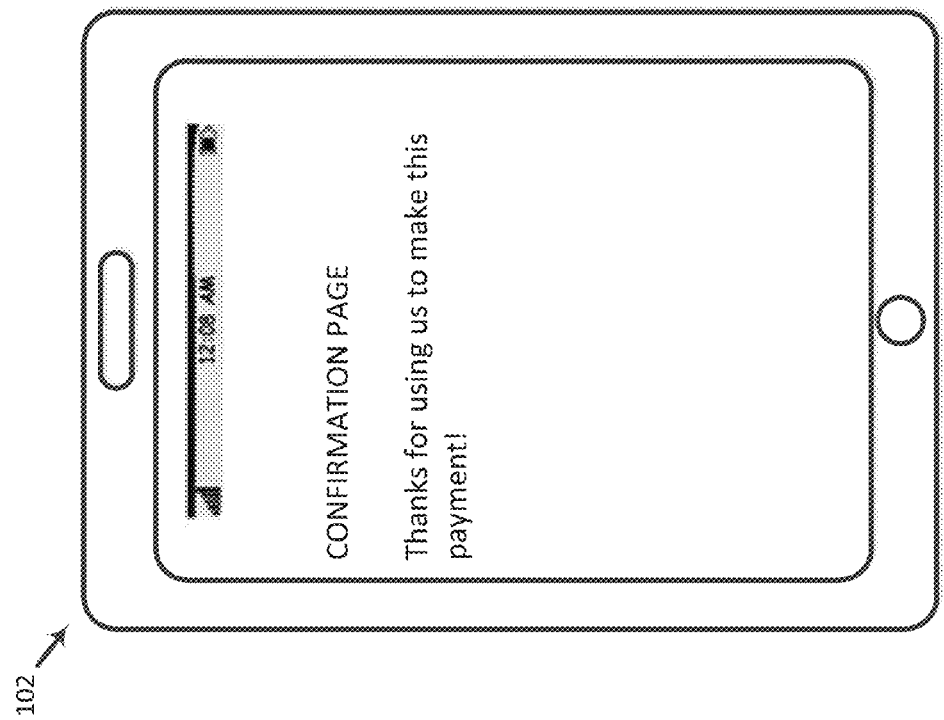
FIG. 3C shows content that may be displayed to the user on a display of the mobile device, after the user selects the user selectable option "Confirm" in accordance with one or more aspects of the present disclosure.
Figure 3B:
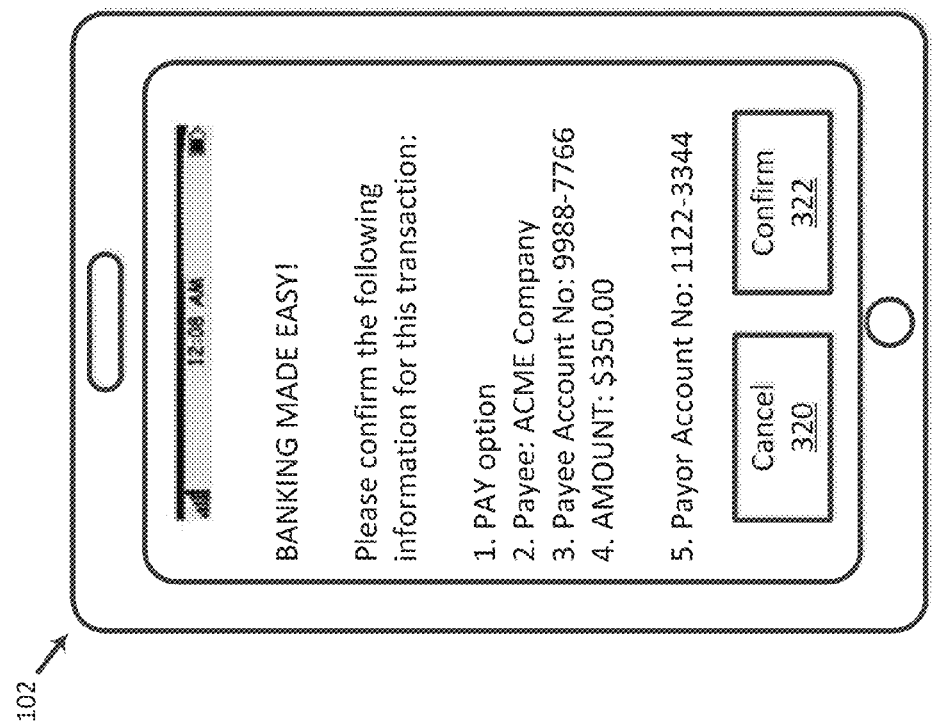
FIG. 3B shows content that may be displayed to a user on a display of the mobile device, after the banking application has received transaction information in accordance with one or more aspects of the present disclosure.

At an action 318, banking application 210 accepts transaction information 314 as input. FIG. 3B shows content that may be displayed to user 130 on a display of mobile device 102, after banking application 210 has received transaction information 314 in accordance with one or more aspects of the present disclosure. Banking application 210 may instruct display engine 104 to request confirmation of the transaction from user 130. For example, banking application 210 may request that user 130 confirm the details of the transaction (e.g., Pay option, ACME Company as payee, "9988-7766" as the Payee account number, "$350.00" as the dollar amount of transaction, and "1122-3344" as the payor's account number). Banking application 210 consumes the transaction information 314 as input.

In FIG. 3B, the display includes a user selectable option "Cancel" 320 and a user selectable option "Confirm" 322. If user 130 selects user selectable option "Cancel" 320, banking application 210 cancels the transaction. If user 130 selects user selectable option "Confirm" 322, banking application 210 processes and completes the transaction. FIG. 3C shows content that may be displayed to user 130 on a display of mobile device 102, after user 130 selects user selectable option "Confirm" 322 in accordance with one or more aspects of the present disclosure. Banking application 210 may instruct display engine 104 to display a confirmation page to inform user 130 that the transaction has been completed, such as is shown in FIG. 3C. Although the application (e.g. banking application 210) that requested the data (e.g., QR code 216) has been described as scanning the data, it should be understood that the requesting application may perform various actions based on the data. In an example, the requesting application saves the data provided by camera interface 122. In another example, the requesting application requests the browser to point to a particular URL based on the data.

As discussed above and further emphasized here, FIGS. 1, 2A-2K, and 3A-3C are merely examples, which should not unduly limit the scope of the claims. For example, it should be understood that one or more modules (e.g., camera interface 122 and software camera 124) in FIG. 1 may be combined with another module. In an example, camera interface 122 and software camera 124 are combined into one module. It should also be understood that one or more modules in FIG. 1 may be separated into more than one module.

Figure 4:
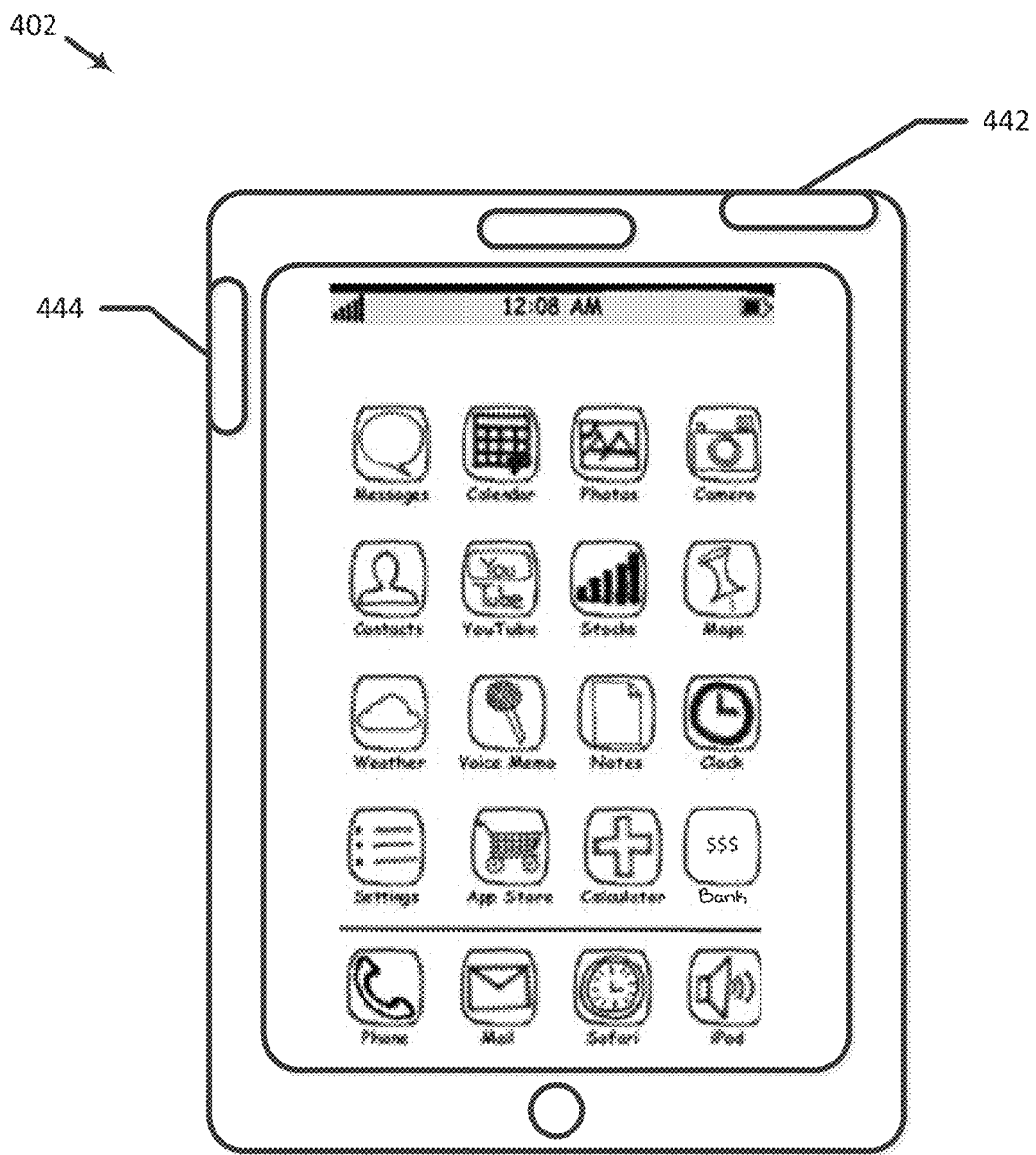
FIG. 4 is a block diagram illustrating a mobile device 402 having buttons for activating the software camera in accordance with one or more aspects of the present disclosure.

Additionally, although software camera icon 244 is illustrated as being included in camera interface 122 and software camera 124 is described as being activated by selecting software camera icon 244, this is not intended to be limiting. For example, in some embodiments, software camera icon 244 is implemented using hardware features disposed on mobile device 102. FIG. 4 is a block diagram illustrating a mobile device 402 having buttons 442 and 444 for activating the software camera in accordance with one or more aspects of the present disclosure. Operating system 120 may detect, while invoice 214 is displayed on display 106, an input selection of a user selectable option to activate software camera 124 of mobile device 102. In an example, operating system 120 may detect the input selection of a user selectable option to activate software camera 124 based on detecting a selection of set of buttons 442 and 444 disposed on mobile device 102. Mobile device 102 may have one or more buttons that is used for activating software camera 124. Software camera 124 may capture a screenshot (or an image) of the content displayed on a display of the mobile device in response to, for example, user 130 pressing the appropriate one or more buttons at the same time and for longer than a threshold amount of time (e.g., 3 seconds, etc.). This is merely an example and other embodiments that activate software camera 124 in other ways are within the scope of this disclosure.

III. Example Methods

Figure 5:
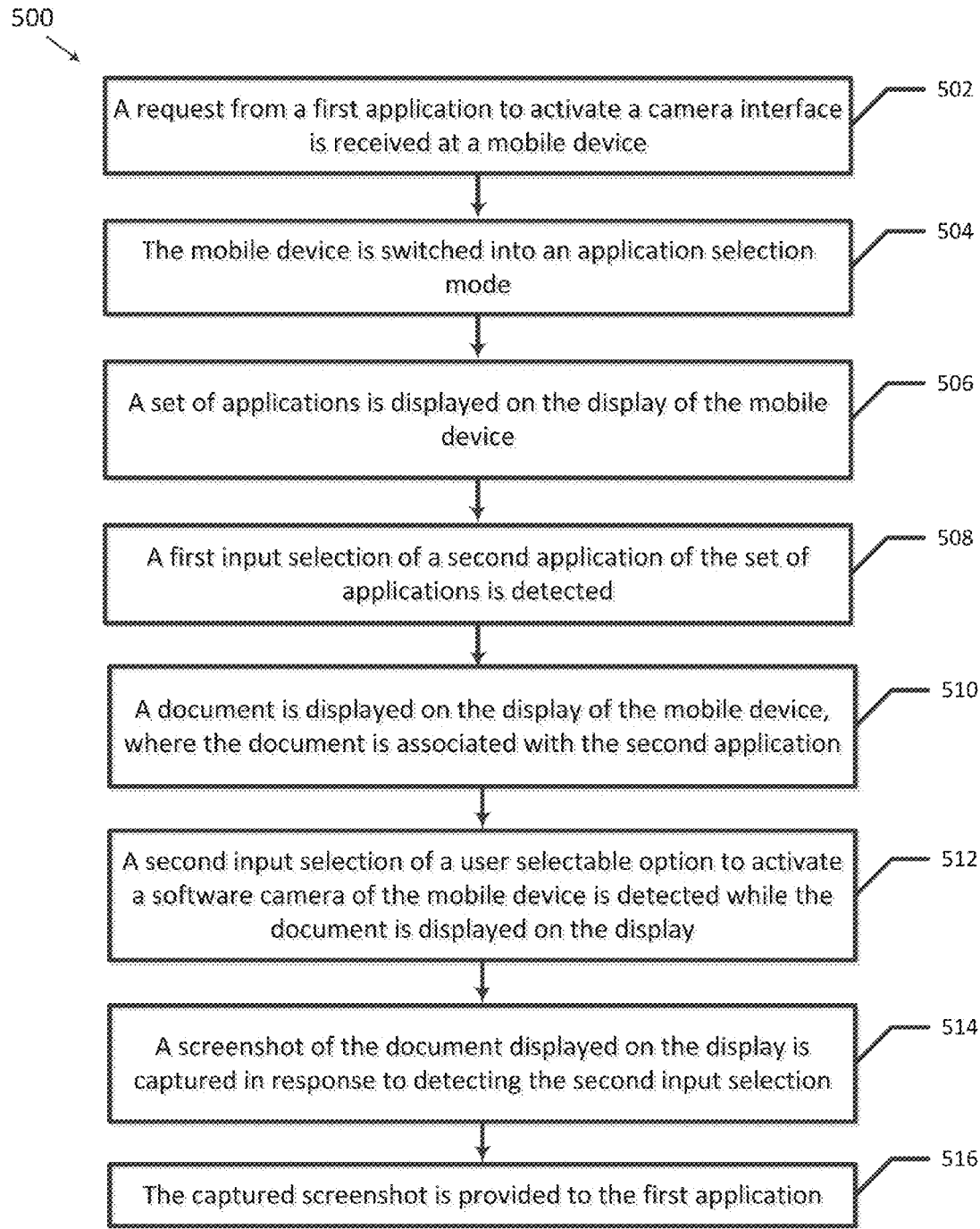
FIG. 5 is a flowchart illustrating a method of providing data to an application running on a mobile device in accordance with one or more aspects of the present disclosure.

FIG. 5 is a flowchart illustrating a method 500 of providing data to an application running on a mobile device in accordance with one or more aspects of the present disclosure. Method 500 is not meant to be limiting and may be used in other applications.

In FIG. 5, method 500 includes blocks 502-516. In a block 502, a request from a first application to activate a camera interface is received at a mobile device. In an example, mobile device 102 receives a request from banking application 210 to activate camera interface 122. In a block 504, the mobile device is switched into an application selection mode. In an example, operating system 120 switches mobile device 102 into an application selection mode.

In a block 506, a set of applications is displayed on the display of the mobile device. In an example, display engine 104 displays a set of applications on display 106 of mobile device 102. In a block 508, a first input selection of a second application of the set of applications is detected. In an example, operating system 120 detects a first input selection of email application 208 of the set of applications. In a block 510, a document is displayed on the display of the mobile device, where the document is associated with the second application. In an example, display engine 104 displays invoice 214 on display 106 of mobile device 102, where invoice 214 is associated with email application 208. In a block 512, a second input selection of a user selectable option to activate a software camera of the mobile device is detected while the document is displayed on the display. In an example, operating system 120 detects, while invoice 214 is displayed on display 106, a second input selection of a user selectable option to activate software camera 124 of mobile device 102.

In a block 514, a screenshot of the document displayed on the display is captured in response to detecting the second input selection. In an example, software camera 124 captures screenshot 306 of invoice 214 displayed on display 106 in response to detecting the second input selection. In a block 516, the captured screenshot is provided to the first application. In an example, camera interface 122 provides the captured screenshot to the first application.

It is understood that additional processes may be inserted before, during, or after blocks 502-516 discussed above. It is also understood that one or more of the blocks of method 500 described herein may be omitted, combined, or performed in a different sequence as desired. In some embodiments, one or more actions illustrated in blocks 502-516 may be performed for any number of requests for input from a camera. Additionally, it is also understood that additional processes may be inserted before, during, or after blocks 502-516 discussed above. It is also understood that one or more of the blocks of method 500 described herein may be omitted, combined, or performed in a different sequence as desired.

IV. Example Computing System

Figure 6:
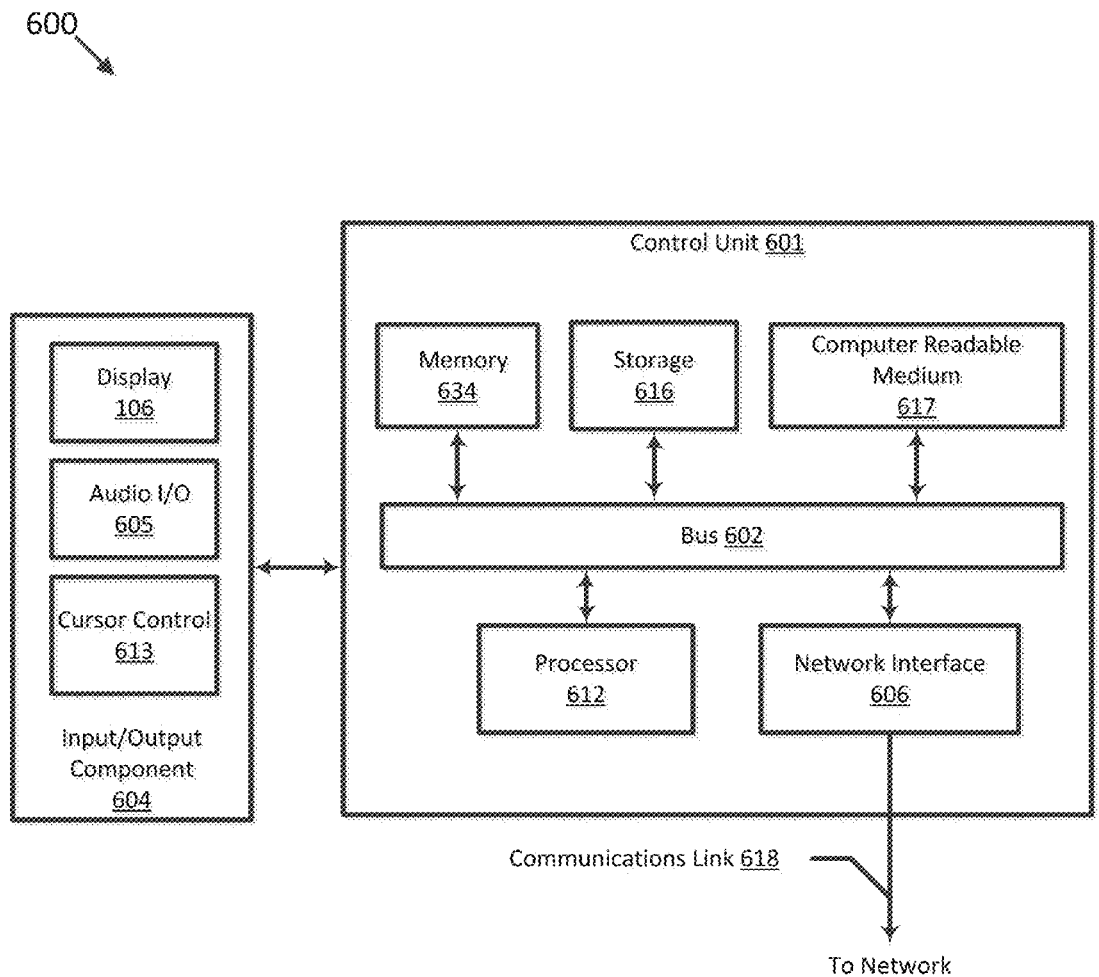
FIG. 6 is a block diagram of an electronic system suitable for implementing one or more embodiments of the present disclosure.

FIG. 6 is a block diagram of a computer system 600 suitable for implementing one or more embodiments of the present disclosure. Each of camera interface 122, software camera 124, applications 108 and 110, display engine 104, and QR code reader 107 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the application server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. A processor 612, which may be a micro-controller, digital signal processor (DSP), or other processing component, processes these various signals, such as for display on computer system 600 or transmission to other devices via communications link 618. Components of computer system 600 also include a system memory component 634 (e.g., RAM), a static storage component 616 (e.g., ROM), and/or a disk drive 617. Computer system 600 performs specific operations by processor 612 and other components by executing one or more sequences of instructions contained in system memory component 634.

Components include an input/output (I/O) component 604 that processes a user action, such as selecting keys from a keypad/keyboard, selecting one or more buttons or links, etc., and sends a corresponding signal to bus 602. I/O component 404 may include an output component such as a display 106, and an input control such as a cursor control 613 (such as a keyboard, keypad, mouse, etc.). An optional audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via communications link 618 to a network. In an embodiment, the transmission is wireless, although other transmission mediums and methods may also be suitable.

Logic may be encoded in a computer readable medium 617, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer readable medium. Transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 500) to practice the present disclosure may be performed by computer system 600. In various other embodiments of the present disclosure, a plurality of computer systems 600 coupled by communications link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method comprising:
   receiving, at a mobile device, a request from a first application to activate a camera interface;
   switching the mobile device into an application selection mode;
   displaying a set of applications on a display of the mobile device;
   detecting a first input selection of a second application of the set of applications;
   displaying a document on the display of the mobile device, wherein the document is associated with the second application;
   detecting, while the document is displayed on the display, a second input selection of a user selectable option to activate a software camera of the mobile device;
   capturing a screenshot of the document displayed on the display in response to detecting the second input selection; and
   providing the captured screenshot to the first application.

2. The method of claim 1, further including:
   displaying the camera interface on the display of the mobile device in response to the request from the first application, wherein the camera interface includes the user selectable option to activate the software camera.

3. The method of claim 2, wherein detecting the second input selection includes detecting a selection of an icon that is displayed on the display and corresponds to the software camera.

4. The method of claim 1, wherein detecting the second input selection includes detecting a selection of a set of buttons disposed on the mobile device.

5. The method of claim 1, further including:
projecting, while the first application is active, data from the second application to the display of the mobile device.

6. The method of claim 1, wherein providing the captured screenshot includes streaming the captured screenshot to an output of the camera interface.

7. The method of claim 6, wherein streaming the captured screenshot includes extracting data from the captured screenshot and providing the extracted data to the first application as an input.

8. The method of claim 1, further including:
detecting, while the first application is open, a third input selection of the user selectable option to activate the software camera.

9. The method of claim 1, wherein receiving the request from the first application includes receiving, at an operating system installed on the mobile device, a request to invoke an application programming interface (API) that activates the camera interface.

10. The method of claim 1, wherein detecting the second input selection includes receiving, at an operating system installed on the mobile device, a request to invoke an application programming interface (API) that captures the screenshot of content displayed on the display.

11. The method of claim 1, wherein the first application requests the captured screenshot and remains in an open state until the first application receives the captured screenshot.

12. The method of claim 1, wherein the document is provided by the second application and includes an image.

13. The system of claim 1, further including:
blocking the mobile device from activating the first application until the screenshot is captured.

14. A system comprising:
an operating system that receives a request from a first application to activate a camera interface, switches a mobile device into an application selection mode, detects a first input selection of a second application of a set of applications, and detects, while a document is displayed on a display of the mobile device, a second input selection of a user selectable option to activate a software camera of the mobile device;
a display engine that displays the set of applications on a first page of the display and displays the document on a second page of the display, wherein the document is associated with the second application,
wherein the software camera captures a screenshot of the document displayed on the display in response to detecting the second input selection, and wherein the camera interface provides the captured screenshot to the first application.

15. The system of claim 14, wherein the display engine displays the camera interface on the display of the mobile device in response to the request from the first application, wherein the camera interface includes the user selectable option to activate the software camera.

16. The system of claim 14, wherein the operating system detects the second input selection by detecting a selection of a set of hardware features disposed on the mobile device.

17. The system of claim 14, wherein the first application is running on the mobile device and accepts an image from the camera interface as an input, and the document is provided by the second application and includes the image.

18. The system of claim 14, further including:
switching the mobile device out of the application selection mode.

19. A non-transitory machine-readable medium comprising a plurality of machine-readable instructions that when executed by one or more processors is adapted to cause the one or more processors to perform a method comprising:
receiving, at a mobile device, a request from a first application to activate a camera interface;
switching the mobile device into an application selection mode;
displaying a set of applications on a display of the mobile device;
detecting a first input selection of a second application of the set of applications;
displaying a document on the display of the mobile device, wherein the document is associated with the second application;
detecting, while the document is displayed on the display, a second input selection of a user selectable option to activate a software camera of the mobile device;
capturing a screenshot of the document displayed on the display in response to detecting the second input selection; and
providing the captured screenshot to the first application.

20. The non-transitory machine-readable medium of claim 19, the method further including:
projecting, while the first application is active, data from the second application to the display of the mobile device.

* * * * *